(12) United States Patent
Elayed et al.

(10) Patent No.: US 9,463,399 B2
(45) Date of Patent: Oct. 11, 2016

(54) LIQUID FILTER CONSTRUCTION FOR FREEZING ENVIRONMENTS

(75) Inventors: Karim Elayed, Sint-Stevens-Woluwe (BE); Tom Teck, Oud-Heverlee (BE); Alain Suttels, Leuven (BE); Daniel Fertil, Watermael Boitsfort (BE)

(73) Assignee: Donaldson Company, Inc., Minneapolis, MN (US)

( * ) Notice: Subject to any disclaimer, the term of this patent is extended or adjusted under 35 U.S.C. 154(b) by 709 days.

(21) Appl. No.: 13/508,699

(22) PCT Filed: Nov. 12, 2010

(86) PCT No.: PCT/US2010/056524
§ 371 (c)(1),
(2), (4) Date: Aug. 29, 2012

(87) PCT Pub. No.: WO2011/060254
PCT Pub. Date: May 19, 2011

(65) Prior Publication Data
US 2012/0312733 A1   Dec. 13, 2012

Related U.S. Application Data

(60) Provisional application No. 61/260,642, filed on Nov. 12, 2009.

(51) Int. Cl.
*B01D 29/21*   (2006.01)
*B01D 29/90*   (2006.01)

(52) U.S. Cl.
CPC ......... *B01D 29/21* (2013.01); *B01D 2201/403* (2013.01)

(58) Field of Classification Search
None
See application file for complete search history.

(56) References Cited

U.S. PATENT DOCUMENTS

| 4,842,737 A | 6/1989 | Reed |
| 5,538,626 A | 7/1996 | Baumann |
| 5,698,097 A | 12/1997 | Gebert et al. |
| 6,245,701 B1 | 6/2001 | Sato |

(Continued)

FOREIGN PATENT DOCUMENTS

| CN | 102596355 | 7/2012 |
| DE | 10052103 | 5/2002 |

(Continued)

OTHER PUBLICATIONS

First Office Action for Chinese Patent Application No. 201080051279.6, mailed Jan. 21, 2014 (22 pages) with English translation.

(Continued)

*Primary Examiner* — Benjamin Kurtz
(74) *Attorney, Agent, or Firm* — Pauly, Devries Smith & Deffner, LLC

(57) ABSTRACT

A liquid filter construction comprising a filter housing is disclosed. The filter housing contains a filter element for filtration of liquids using a urea aqueous solution. A compressible element is positioned within the filter housing, the compressible element comprising an enclosure containing a gas-filled volume. This compressible element compresses in response to the generation of pressure from freezing of liquid within the filtration housing. The compression of the compressible element thereby avoids damage to the filter element, the filter housing, and adjacent equipment.

7 Claims, 17 Drawing Sheets

(56) References Cited

U.S. PATENT DOCUMENTS

| | | |
|---|---|---|
| 7,323,102 B2 | 1/2008 | Klein et al. |
| 7,407,594 B2 | 8/2008 | Laverdiere et al. |
| 7,481,319 B2 | 1/2009 | Jokschas et al. |
| 7,513,373 B2 | 4/2009 | Kramer |
| 2003/0209482 A1 | 11/2003 | Klotz et al. |
| 2005/0077230 A1* | 4/2005 | Jokschas et al. ............ 210/446 |
| 2006/0196156 A1* | 9/2006 | Thomas et al. ................ 55/498 |
| 2008/0197064 A1 | 8/2008 | Blasco Remacha et al. |
| 2009/0218295 A1* | 9/2009 | Verdegan et al. ............ 210/741 |

FOREIGN PATENT DOCUMENTS

| | | |
|---|---|---|
| DE | 19716085 | 2/2007 |
| DE | 102006048721 | 4/2008 |
| EP | 745413 | 12/1996 |
| EP | 1510239 | 3/2005 |
| EP | 1731210 | 6/2009 |
| EP | 2062633 | 10/2010 |
| EP | 2498892 | 9/2012 |
| JP | 60195916 U | 12/1985 |
| JP | 61197013 | 9/1986 |
| JP | H0528404 | 4/1993 |
| JP | 06058302 | 3/1994 |
| JP | H07100325 | 4/1995 |
| JP | 2003172224 | 6/2003 |
| JP | 2003525732 | 9/2003 |
| JP | 2004255310 | 9/2004 |
| JP | 2004298870 | 10/2004 |
| JP | 2013510712 | 3/2013 |
| WO | 2007020179 | 2/2009 |
| WO | 2009019283 | 4/2009 |
| WO | 2011060254 | 5/2011 |

OTHER PUBLICATIONS

Office Action for Japanese patent Application No. 2012-539015, mailed Dec. 9, 2014 (8 pages) with English summary.

Second Office Action for Chinese Patent Application No. 201080051279.6, mailed Nov. 2, 2014 (19 pages) with English translation.

International Preliminary Report on Patentability from Application No. PCT/US2010/056524 mailed May 24, 2012, 7 pages.

PCT International Search Report and Written Opinion from Application No. PCT/US2010/056522, mailed May 2, 2011, 10 pages.

Third Office Action for Chinese Patent Application No. 201080051279.6, mailed Jun. 24, 2015 (21 pages) with English translation.

* cited by examiner

LIQUID FILTER CONSTRUCTION FOR FREEZING ENVIRONMENTS

FIELD OF THE INVENTION

The present invention relates to filters, more specifically to liquid filters that may be exposed to freezing conditions.

BACKGROUND OF THE INVENTION

Elevated temperatures inside internal combustion engines can produce nitrogen oxides in exhaust gases. Regulations in many jurisdictions limit the emission of nitrogen oxides into the atmosphere because of their known adverse effects on the environment. One way of controlling nitrogen oxide emissions is injection of a hydrogen rich chemical into the exhaust stream, such as urea in an aqueous solution. The urea, or similar chemical, undergoes a chemical reaction that converts nitrogen oxides within the exhaust fumes into harmless nitrogen and water. Such systems can significantly reduce the concentration of nitrogen oxides in the exhaust fumes to comply with environmental regulations.

The urea or other hydrogen rich material that is dosed into the exhaust stream must be filtered in order to prevent damage to the dosing module. However, unlike most fluid filters necessary for operation of internal combustion engines, the hydrogen rich material necessary for removal of nitrogen oxides is typically an aqueous solution, and as such is susceptible to freezing at low temperatures. When an aqueous solution freezes, it expands in volume. The increase in volume at the fluid freezing temperature is dependent on the type of aqueous solution, but is often in the range of ten percent. Expansion in volume can lead to significant increases in pressure if that expansion occurs within an enclosed vessel, such as a filter housing. When volume expansion is not accounted for, freezing of the fluid can increase pressure inside the filter housing and result in damage to the housing, filter element or both.

Freezing patterns in fluids follow thermal patterns and vary significantly depending upon the geometry of the vessel containing the fluid. A liquid starts to solidify at the lowest temperature at or below the freezing temperature. This phenomena can start anywhere inside a filter housing. Temperature of a fluid inside a housing is usually not constant because there can be thermal patterns and temperature gradients. As the overall temperature drops, an aqueous solution starts to freeze at the lowest temperature location. This location can occur anywhere in the fluid and can entrap a liquid in a section of the housing. If that entrapped liquid is unable to find a volume into which it can expand, the filter housing and elements can be damaged.

One approach to solving the problem of liquids freezing in a filter housing is the use of a flexible or elastic filter housing, such as that described in U.S. Pat. No. 4,842,737. A significant drawback to such designs is that the use of a deformable filter housing imposes serious constraints on how the filter housing is mounted on an engine, because additional space needs to be available for the filter housing to expand during freezing of the fluid inside the filter. Another drawback with flexible housings is that it is difficult to construct a flexible filter housing that matches the durability and strength of a rigid filter housing. Thus, flexible housings increase the risk for mechanical failure and possible leaks, and are disfavored over rigid housings.

Another available approach to addressing the problem of liquids freezing within a filter housing is described in Japanese Patent No. JP61197013-A, which uses a flexible membrane attached to the inside of the housing of the filter and which delimits a certain volume of air on one side of the membrane. When the liquid in the filter freezes and expands in volume the air pocket behind the membrane is designed to take up the increased volume of the liquid while deforming the membrane elastically. However, this membrane arrangement is rather complex and fragile, which increases the risk for leakages and mechanical failure if the membrane fails or a leak otherwise develops.

A similar approach incorporates a compressible foam component instead of a flexible membrane. Such component generally has a multitude of air-containing cells that at least partially collapse when exposed to liquid pressure exceeding one bar of absolute pressure. Over time, repeated pressure changes resulting in repeated expansion and contraction of cell walls cause degradation of the foam component. In addition, the foam component, as it ages, can develop cracks that get penetrated by liquid, which can freeze and then thaw. Such changes in state also degrade cell walls of the foam component. Finally, exposure to petroleum also degrades many types of foam that can be implemented in these systems. Any degradation in the foam prevents the component from effectively absorbing volume when the aqueous solution freezes.

A similar approach to addressing the fluid-expansion problem is detailed in U.S. Pat. No. 7,481,319, which describes use of an expansion element placed in contact with the filter element inside a filter housing. These expansion elements also consist of a deformable foam material having air-containing cells that risk collapse when exposed to pressurized liquid. However, the expansion element can only take up small volume changes of liquid because it is made out of a deformable foam that has a high solids level. Also, the deformable element is in contact with the filter element, so the filter element cannot readily take up volume changes of the liquid in that direction. This limits the number of possible freezing patterns that can occur without damaging the filter or housing, and increasing the risk of damage to the filter housing, the filter element, or both. Lastly, this approach to addressing fluid-expansion problems is also susceptible to foam degradation for the reasons explained in the paragraph above.

Thus, a need exists for an improved filter construction for use in conditions where the fluid to be filtered is pressurized and subject to freezing.

SUMMARY OF THE INVENTION

The present invention is directed to a filter construction for filtering liquids. The filter construction allows for significant levels freezing of liquids within a filter housing without damage to the housing or internal components within the housing. The filter housing contains a compressible element that compresses upon freezing of some or all of the liquid within the housing, thereby avoiding the build-up of damaging pressure within the housing. The compressible element maintains at least minimum compressibility when subjected to a pressurized fluid.

In an example embodiment the compressible element includes a gas filled volume surrounded by a flexible wall. The wall is made, for example, of an elastomeric material such as nitrile butadiene rubber, hydrogenated nitrile butadiene rubber, fluoroelastomers, butyl rubber, and combinations thereof. Other materials can also be used. The gas filled volume can be, for example, the shape of a flattened sphere (or similar shape), which allows for compression in any direction, thereby allowing for relieve of freezing patterns in any direction.

The compressible element with the gas filled volume is designed so as to have a large gas volume, which correlates to greater compressibility, while having flexible walls that are durable enough to withstand repeated freeze-thaw cycles, as well as repeated pressurization cycles associated with turning an engine on and off. Generally the gas-filled volume of the compressible element comprises at least 50 percent of the volume of the compressible element, often at least 70 percent of the volume of the compressible element, and in some embodiments at least 80 percent of the volume of the compressible element. In yet other embodiments the gas-filled volume of the compressible element comprises at least 90 percent of the volume of the compressible element.

Water and many aqueous solutions will expand by about ten percent upon freezing. Therefore, it can be desirable to have the gas-filled volume within the compressible element be 10 percent or more of the total volume of liquid typically within the filter housing. Indeed, even greater percentages of gas-filled volume are advantageous because the gas filled volume is unable to compress completely without excess pressure developing within the filter housing. Thus, in some embodiments gas-filled volumes greater than 10 percent of the total liquid volume of the housing are desired, while in other implementations gas-filled volumes greater than 15 percent of the total liquid volume of the housing are desirable, and in yet other embodiments gas-filled volumes greater than 20 percent of the total liquid volume of the housing are desirable. It will be understood, however, that volumes of less than 10 percent, and even less than 5 percent, can be useful because the entire fluid within the filter will not necessarily freeze.

In certain embodiments the compressible element can be compressed by at least 25 percent when exposed to pressure from a freezing fluid, and then returns to its original volume (or nearly its original volume) upon melting of the freezing fluid. In other embodiments the compressible element can be compressed by at least 35 percent when exposed to pressure from a freezing fluid, and then returns to its original volume (or nearly its original volume) upon melting of the freezing fluid. In other embodiments the compressible element can be exposed to pressure from a freezing fluid and be compressed by at least 50 percent then returns to its original volume (or nearly its original volume) upon melting of the freezing fluid.

Cycling of the compressible element through many freeze-thaw cycles within a filter housing is a good measure of the suitability of the element for use in a filter. Such cycling repeatedly changes the volume of the compressible element, thereby allowing a measurement of performance and durability of the element. After 100 freeze-thaw cycles, the compressible element should generally still return to at least 90 percent of its original volume, more commonly at least 95 percent of its original volume, and in certain embodiments at least 98 percent of its original volume. Often there will be no apparent diminishment in size of the compressible element after a 100 or more freeze thaw cycles, nor will there be apparent diminishment in the compressibility of the element or in it's the volume of gas enclosed within the compressible element.

Typically the compressible element is compressible from all directions. This allows the element to provide improved pressure relief in situations where the fluid freezes in an unusual pattern or wherein freezing fluid builds up pressure non-uniformly within the housing. In some embodiments the compressible element is uniformly compressible from all directions, such as when the element has a substantially spherical shape. In other implementations the compressible element is shaped like a partially flattened sphere, and thus is more compressible in some directions than others.

The compressible element can be configured such that it is not in direct contact with the filter element, although in some alternative implementations it is in direct contact with the filter element. Generally the compressible element is positioned near an end of the filter housing because the center of the housing is occupied by the filter element and fluid-flow channels.

It will be understood that filter housings can contain more than one compressible element. Additional elements can be positioned adjacent to one another, but more typically are positioned apart from one another, optionally at opposite ends of the filter housing.

In an example alternative embodiment, the compressible element includes a foam-filled volume surrounded by a flexible enclosure wall. In such embodiments the compressible element typically includes a particularly durable and water-proof enclosure wall so as to avoid penetration of liquid into the foam, thereby avoiding deterioration in compressibility.

In an alternative embodiment, a filter is constructed with a compressible element comprising an enclosure forming an expandable piston, and a spring positioned within the piston, the spring configured to expand and allow contraction of the volume of the expandable piston in response to freezing fluids.

In yet another alternative embodiment, a liquid filter construction comprises a filter housing, the filter housing configured to retain a filter element for filtration of liquids. An air-retaining element is positioned within the filter housing, the air retaining element comprising a void volume in fluid communication with liquids within the filter housing. Upon partial freezing of liquid within the filter housing, the void volume in the air retaining element is at least partially filled with displaced liquid or displaced liquid that has frozen. The amount of gas within the volume is reduced by compression, and upon thawing the gas within the void volume expands and returns to its pre-freezing volume.

In another alternative embodiment, a liquid filter assembly has a housing, configured to retain a filter element for filtration of liquids. An air-retaining element is positioned within the filter housing, and defines an opening leading to a void volume in fluid communication with liquids within the filter housing. Upon partial freezing of liquid within the filter housing, the void volume in the air retaining element is at least partially filled with displaced liquid through the opening of the air retaining element. The volume of gas within the void volume is reduced by compression imposed by the liquid entering the void volume. Upon thawing, the liquid exits the void volume through the opening and the gas within the void volume expands and returns to its pre-freezing volume. In this particular embodiment, the air-retaining element can have a rigid housing.

The above summary of the present invention is not intended to describe each disclosed embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION

Figure 1:
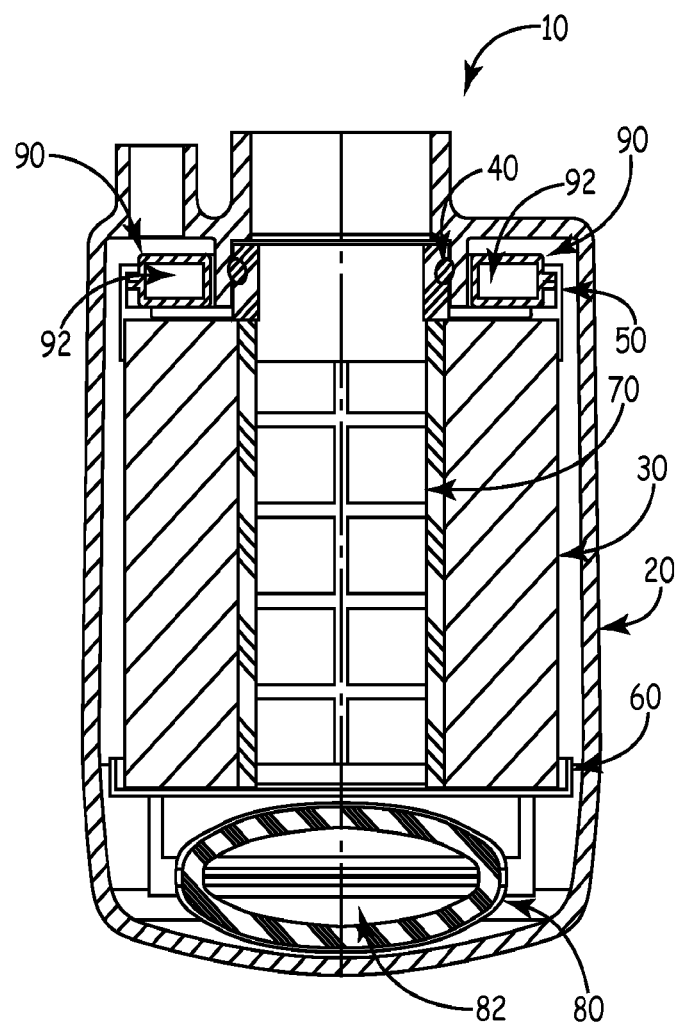
FIG. 1 shows a cross sectional view of a liquid filter assembly made in accordance with a first implementation of the invention.

A liquid filter assembly containing a filter housing and further components for it are disclosed. The filter housing is configured to retain a filter element for the filtration of liquids. A compressible element is positioned within the filter housing to allow for expansion space in the event that liquid within the filter construction undergoes freezing and expansion. The compressible element comprises a wall surrounding a gas-filled volume. This compressible element compresses in response to the generation of pressure from freezing of liquid within the filtration housing by compression of the gas-filled volume. The compression of the compressible element prevents damage to the filter element, the filter housing, and adjacent equipment by relieving pressure within the housing. The compressible element is typically completely immersed and surrounded by the fluid, and thus must be chemically compatible with fluid.

In typical embodiments the compressible elements have an outside skin made of a stretchable but generally non-compressible material such as, but not limited to, nitrile butadiene rubber (NBR), hydrogenated nitrile butadiene rubber (HNBR), fluoroelastomers (FKM), butyl, or other types of material providing flexibility at low temperatures. In one embodiment the skin is a rigid material.

The outside skin layer should be selected to have low permeability to fluids. In a variety of embodiments the skin layer has no permeability to a plurality of fluids. In addition, the outside skin layer should be selected so as to have resistance to hydrocarbons, such as diesel fuel, which is can be present even in low concentrations in aqueous solutions associated with internal combustion engines.

In one implementation, the skin of a compressible element can have multiple layers of materials to achieve the advantages across those types of materials, and avoid the disadvantages when using a single material. For example, in one embodiment nitrile butadiene rubber can be used as the outside layer due to its resistance to diesel fuel, and butyl can be used as an inner layer because of its relative permeation resistance to the gas inside the compressible element, despite being reactive to diesel fuel.

In one example embodiment the skin is made from nitrile butyl rubber with a low permeation rate and has a thickness ranging from 1 mm (0.039 inches) to 5 mm (0.197 inches). In one other example embodiment, the skin is made from a combination of nitrile butyl rubber and butyl rubber and has a thickness ranging from 1 mm (0.039 inches) to 5 mm (0.197 inches). In yet another example embodiment, incorporating a rigid skin that does not flex, the skin is made from glass filled nylon and has a thickness ranging from 1 mm (0.039 inches) to 3 mm (0.118 inches). Those having skill in the art will appreciate that increasing the thickness can lower the gas permeability of the skin, but such an increase can correlate with a lower void volume of the compressible element, itself. As such, a variety of skin thicknesses can be used that correlate with a void volume (and compressible gas therein) that is able to compress in response to particular pressure increases within the filter housing to recover the intended volume Compressible elements made in accordance with the invention have gases enclosed within them such that the elements have a very high potential compression ratio. The highly compressible element springs back to its original form, or nearly to its original form, when pressure is removed. Generally the elements are able to be repeatedly compressed by at least 25 percent, desirably be compressed by at least 35 percent, and in some implementations be compressed by at least 50 percent without loss of compressibility. In an alternative embodiment, a compressible element may define a volume that is filled with a compressible foam material.

It is desirable that the compressible elements be constructed in a manner that allows them to be repeatedly deformed through numerous freeze-thaw cycles, as well as pressure cycles associated with normal engine use. Even when the compressible elements are not subject to a freeze-thaw cycle, they must often still undergo pressure cycles during normal operation, such as cycles associated with pressurizing fluids in an engine at start-up and during operation, followed by depressurization when the engine is turned off. Indeed, such pressurization cycles can be very significant—for example up to 5 bar in current high pressure systems, while even higher pressures are possible.

Reference will now be made to FIG. 1, showing a cross section of a filter assembly 10 made in accordance with an implementation of the invention. The filter assembly 10 includes a filter housing 20 (shown in basic detail) and filter element 30 placed within the housing 20. The filter element 30 seals clean and dirty sides of the filter with seal 40.

The filter housing 20 is generally formed of a material having sufficient rigidity to support the filter element, to allow installation and removal, to withstand impact, and to withstand conditions in cold outside environments, often including use on vehicles. Typically the filter housing is constructed of metal or molded plastic, and is relatively rigid.

In the depicted embodiment of FIG. 1, the filter element 30 has a top end-cap 50 and a bottom end-cap 60. An inner liner 70 combines with the top end-cap 50 and bottom end-cap 60 to provide support for filter element 30. Thus, filter element 30 includes filter media that is supported by inner liner 70, and also generally sealed to top and bottom end caps 50, 60. In an alternative embodiment, no inner liner 70 is used.

A compressible element 80 with void volume 82 is positioned in the housing 20. Void volume 82 is filled with an entrapped gas (such as air). In the depicted embodiment, the compressible element 80 is located below bottom end-cap 60 and does not make contact with bottom end-cap 60 or filter housing 10. The compressible element 80 can generally be disposed outside areas of fluid flow within the filter housing 10. In certain embodiments the compressible element 80 is held in place with a bracket in bottom end-cap 60.

Additional compressible element 90 with void volume 92 is located above top end-cap 50 in the example configuration shown in FIG. 1. In certain embodiments the compressible element 90 does not make contact with top end-cap 50 and filter housing 20. This compressible element 90, shown in cross section in FIG. 1, has a "donut" shape that follows along the circumference of the filter housing 20.

Figure 2:
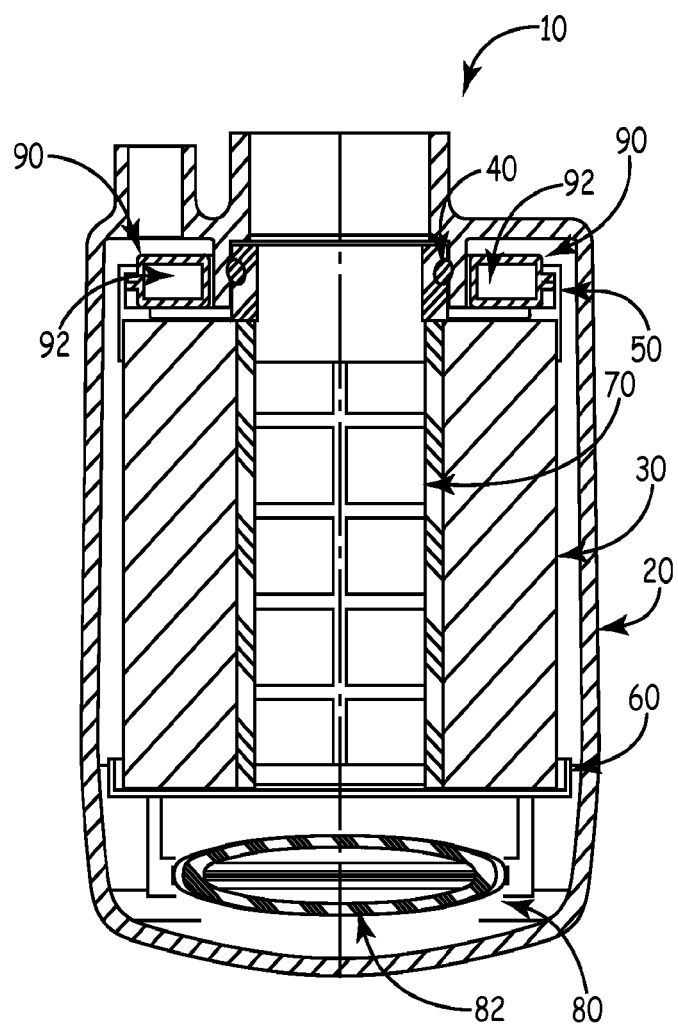
FIG. 2 shows a cross sectional view of the liquid filter assembly of FIG. 1, showing the filter construction with a deformed compressible element that has been compressed under pressure resulting from freezing of a fluid.

Referring now to FIG. 2, the filter assembly 10 of FIG. 1 is shown, but with the compressible element 80 demonstrating a deformation due to an increase in pressure within the housing 20. In FIG. 2 the compressible element 80 has mostly deformed along an axis running through the center of the filter assembly 10. Compressible element 90 can also show deformation, although such deformation is not depicted in FIG. 2. It will be understood that compressible element 80 and compressible element 90 will not necessarily have identical levels of compression, because the pressure from freezing fluids is not necessarily uniform within the filter assembly 10.

Figure 3A:
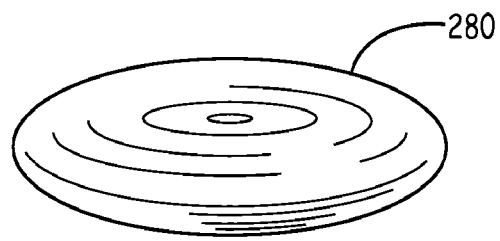
FIG. 3A shows a side perspective view of a compressible element constructed in accordance with an implementation of the invention.
Figure 3B:
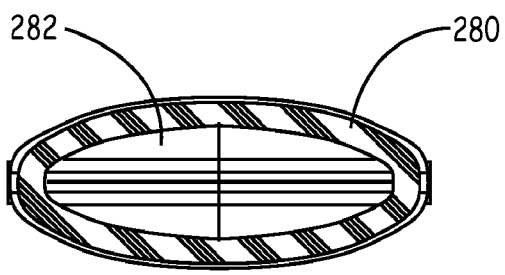
FIG. 3B shows a cross sectional view of the compressible element of FIG. 3A, with the compressible element at atmospheric pressure.
Figure 3C:
FIG. 3C shows a cross sectional view of the compressible element of FIG. 3A, with the compressible element partially compressed under greater than atmospheric pressure.

FIGS. 3A-3C further show an example compressible element 280, similar to that depicted in FIGS. 1 and 2. FIG. 3A shows the compressible element 280 in a side perspective view, while FIGS. 3B and 3C show cross-sectional views of the compressible element 280 along with void volume 282 within the compressible element 280. In FIG. 3B the compressible element 280 is shown at atmospheric pressure, while in FIG. 3B the compressible element 280 is shown with the compressible element deformed and compressed as a result of increased pressure within a filter housing (not shown).

Figure 9:
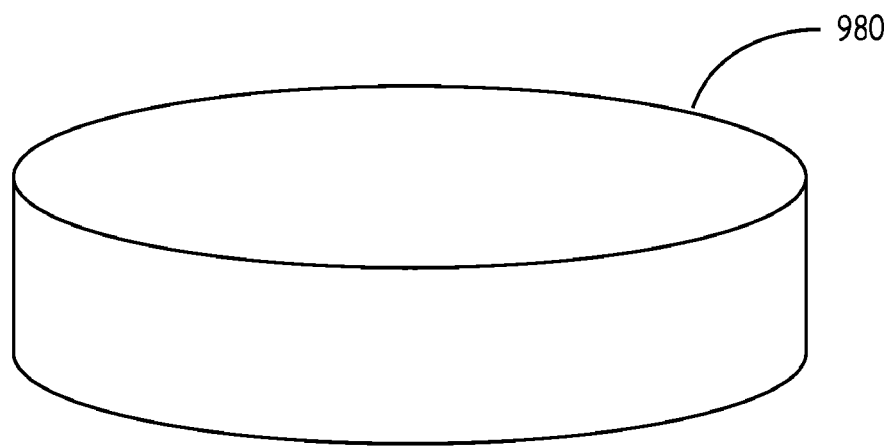
FIG. 9 shows a perspective view of an alternative embodiment of a compressible element constructed in accordance with an implementation of the invention.
Figure 10A:
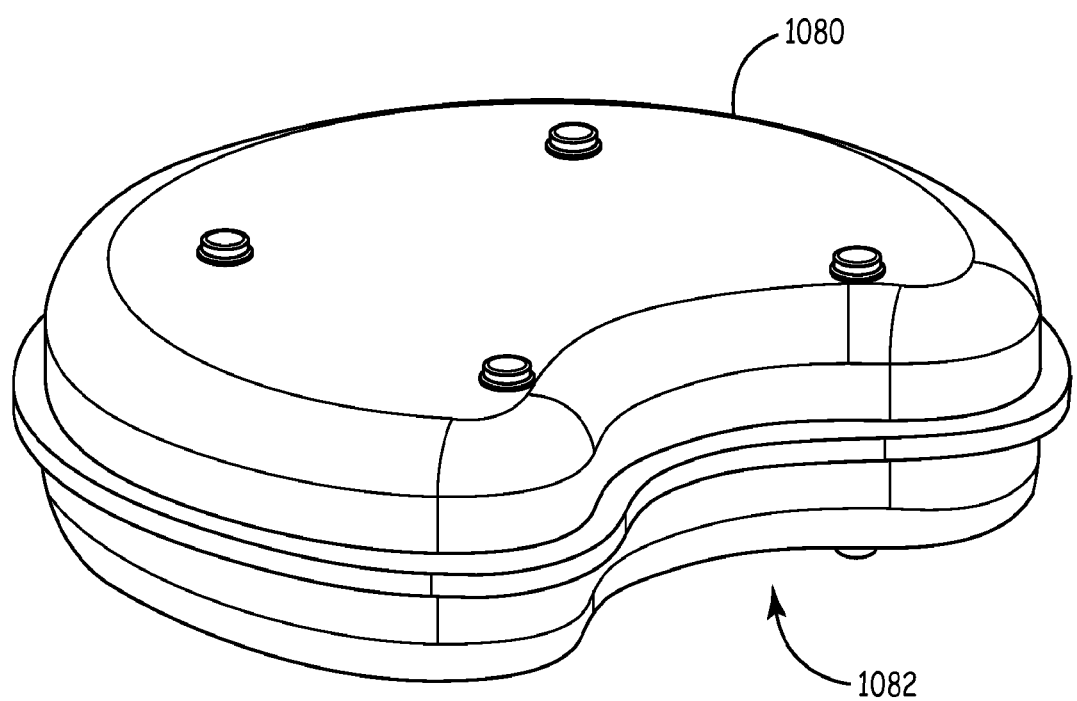
FIG. 10A shows a perspective view of another alternative embodiment of a compressible element constructed in accordance with an implementation of the invention.
Figure 10B:
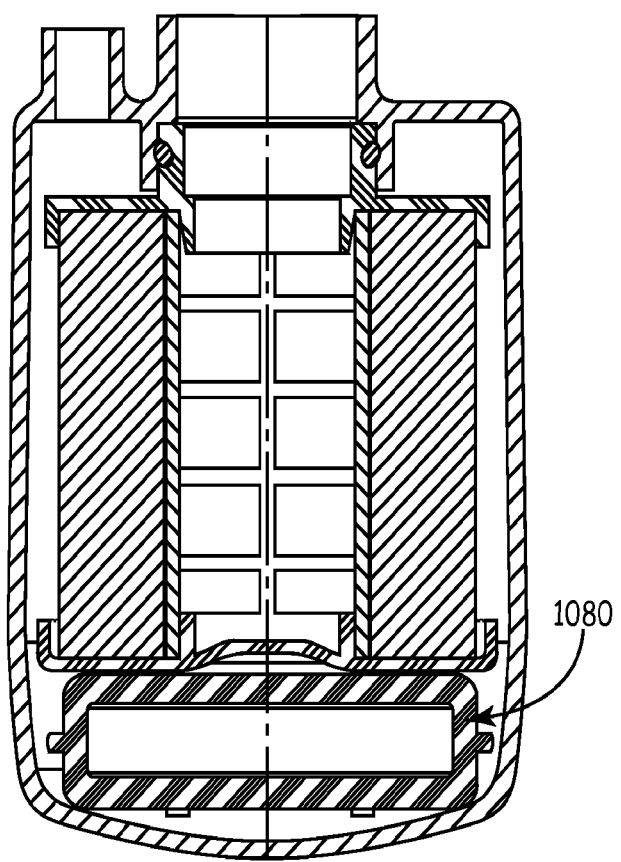
FIG. 10B shows a cross-sectional view of an example implementation incorporating the compressible element depicted in FIG. 10A.

FIGS. 9-12 depict a variety of alternative embodiments for compressible elements that are consistent with embodiments of the technology disclosed herein. FIG. 9, for example, depicts a compressible element 980 that is substantially cylindrical. Furthermore, FIG. 10A depicts a compressible element 1080 that is substantially cylindrical and defines an opening 1082 extending through the compressible element 1080. In at least one implementation, the opening 1082 that is defined can accommodate fluid flow adjacent to the compressible element. FIG. 10B depicts an example implementation of the compressible element 1080 depicted in FIG. 10A. Those having skill in the art will appreciate that the compressible element can define a variety of shapes and configurations.

Figure 11:
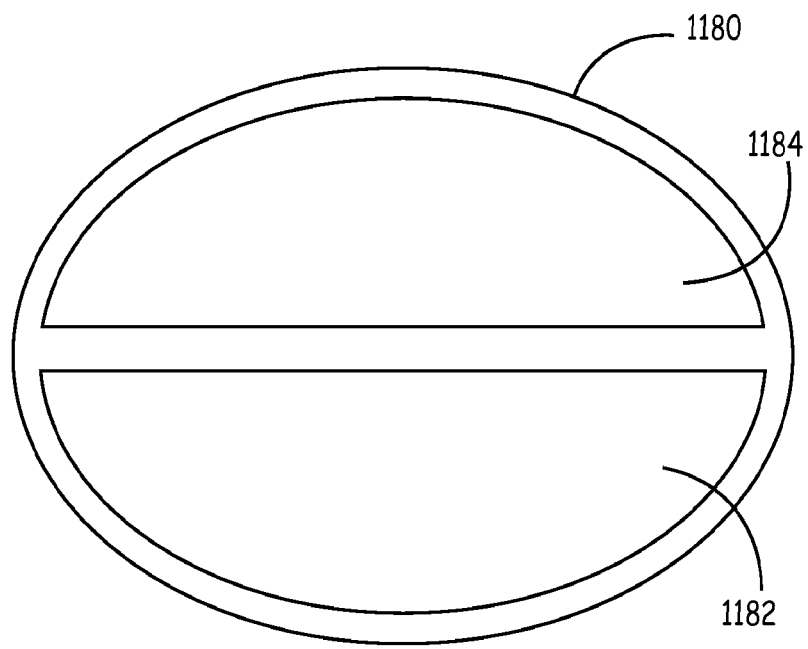
FIG. 11 shows a cross-sectional view of an alternative embodiment of a compressible element constructed in accordance with an implementation of the invention.
Figure 12:
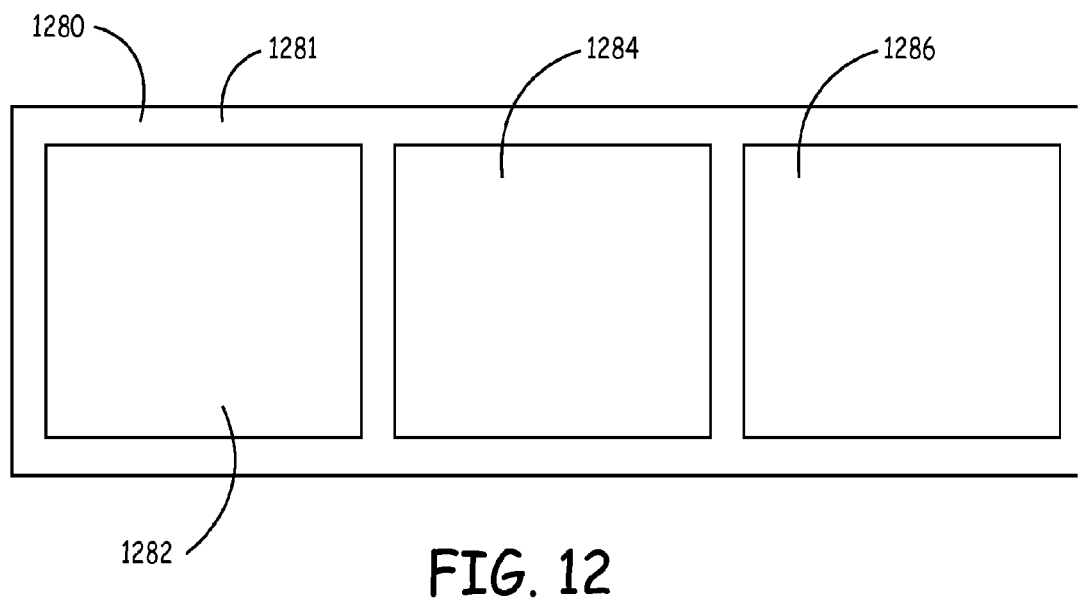
FIG. 12 shows a cross-sectional view of another alternative embodiment of a compressible element constructed in accordance with an implementation of the invention.

As two additional examples, FIGS. 11 and 12 depict cross sections of compressible elements that are consistent with embodiments of the technology disclosed herein. FIG. 11 shows the cross section of a compressible element 1180 defining a first void 1182 and a second void 1184 therein. FIG. 12 shows a cross section of a compressible element 1280, having a different shape of the compressible element 1180 of FIG. 11, which defines a first void 1282, a second void 1284, and a third void 1286 therein. In the event of damage to the compressible element 1280 that breaches containment of the first void 1282, for example, the second void 1284 and the third void 1286 remain functional.

Figure 4:
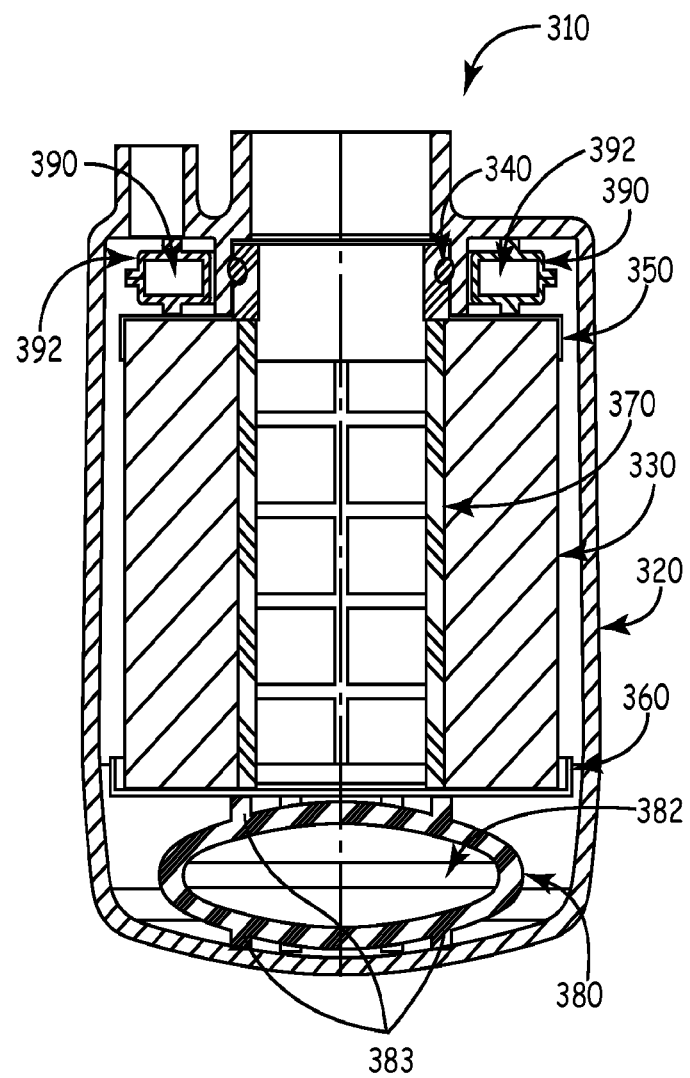
FIG. 4 shows an alternative filter assembly made in accordance with an implementation of the invention.

Referring now to FIG. 4, a filter assembly 310 with an alternative compressible element 380 is depicted, with interior volume 382. In FIG. 4 the compressible element 380 includes a series of protrusions 383 which extend from the outside of the compressible element 380. These protrusions help to position the compressible element within the housing 320, while also maintaining distance between the main portion of the compressible element 380 and the bottom plate 360. FIG. 4 also shows an optional inner liner 370 supporting a filter element 330, plus top plate 350 and compressible elements 390 adjacent the top plate, the compressible elements filled with a gas in the void volume 392.

Figure 5:
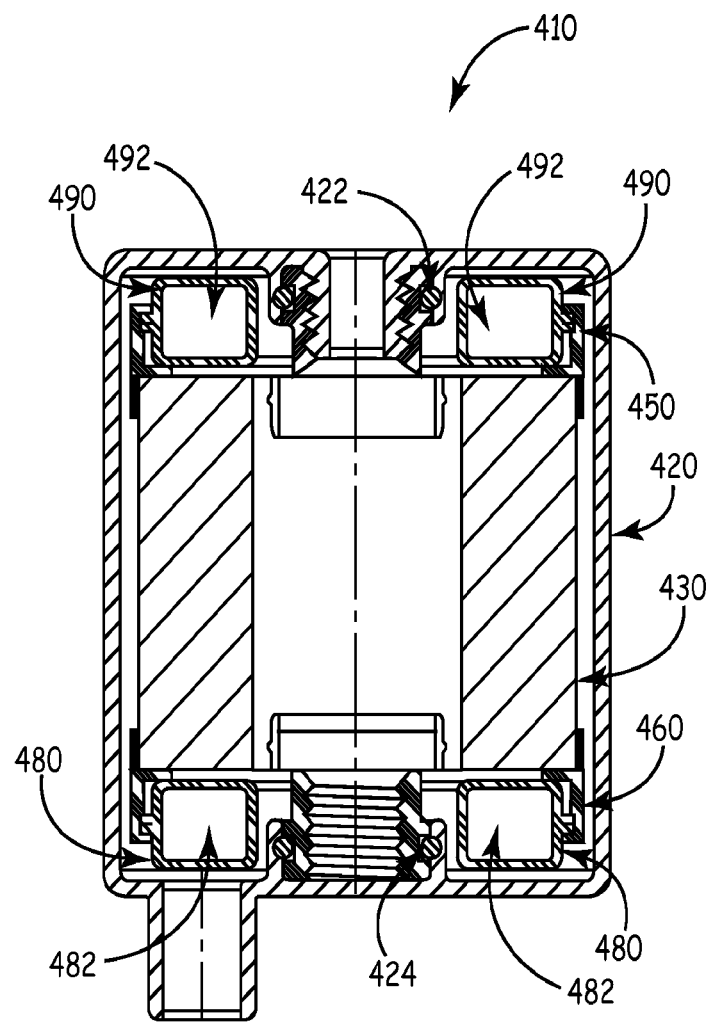
FIG. 5 shows an alternative filter assembly made in accordance with an implementation of the invention.

Referring now to FIG. 5, an alternative filter assembly 410 is made up of a filter housing 420 (shown in basic detail) and filter element 430. The filter element 430 attaches to filter housing 420 and seals clean and dirty sides of the filter with seals 422 and 424. The filter element 430 has a top end-cap 450 and bottom end-cap 460. Compressible element 480 and gas 482 is located below bottom end-cap 460. Similarly, compressible element 490 with entrapped gas 492 is located above top end-cap 450. Compressible elements 480 and 490 are both "donut" shaped configurations in the depicted embodiment, but it will be understood that other shapes can be used.

Figure 6:
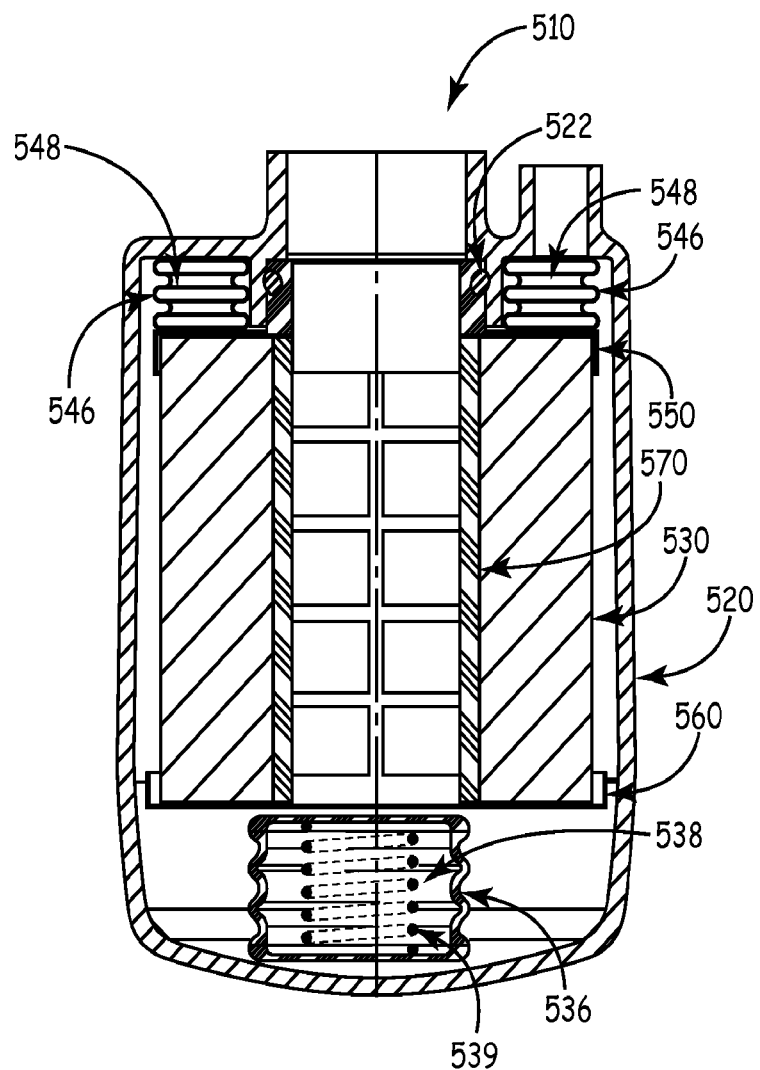
FIG. 6 shows an alternative filter assembly made in accordance with an implementation of the invention.

In reference now to FIG. 6, a further embodiment of a filter assembly made in accordance with the present invention is shown. Filter assembly 510 is constructed and arranged in accordance with an implementation of the invention. This filter assembly 510 is made up of a filter housing 520 (shown in basic detail) and filter element 530. The filter element 530 attaches to filter housing 520 and seals clean and dirty sides of the filter with a seal 522. The filter element 530 has a top end-cap 550, bottom end-cap 560 and an optional inner liner 570. Piston 536 with entrapped gas 538 and spring 539 are located below bottom end-cap 560. The piston 536 allows for expansion and contraction of a volume of gas within the housing, thereby allowing expansion room for freezing fluids. Similarly, pistons 546 with entrapped gas 548 are located above top end-cap with 550. In at least one embodiment the springs 539 may be omitted in lieu of another compressible pressure source such as, for example, a pressurized gas. Those having skill in the art will appreciate other possible pressure sources on the side of the piston opposite the filter fluid.

Figure 7:
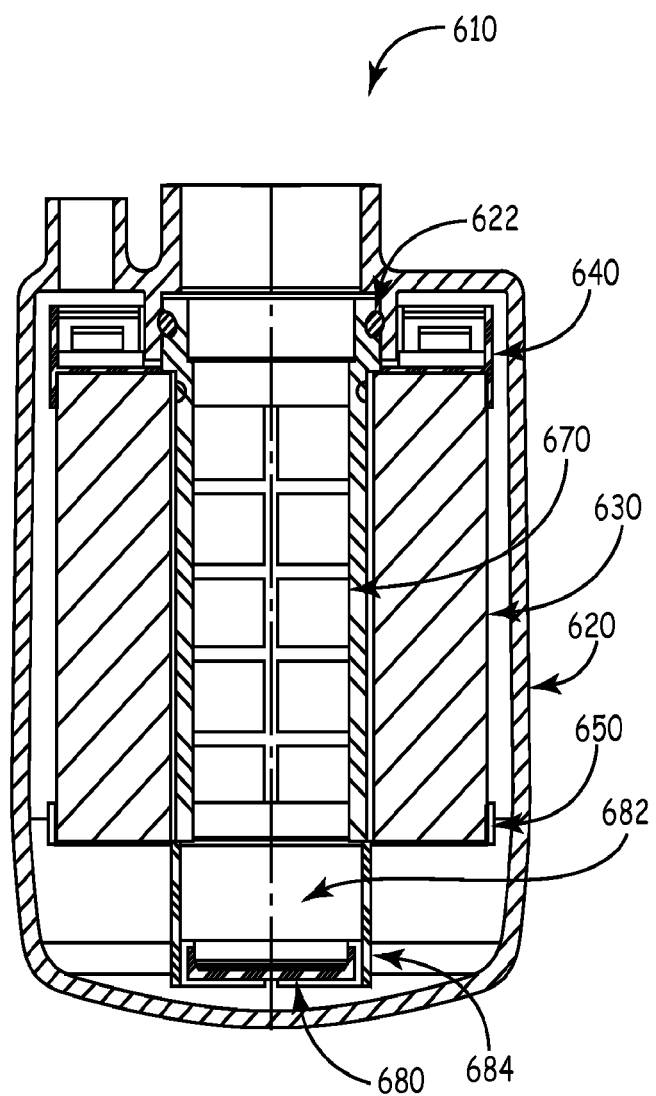
FIG. 7 shows an alternative filter assembly made in accordance with an implementation of the invention.

FIG. 7 shows an improved filter assembly 610 made up of a filter housing 620 (shown in basic detail) and filter element 630. The filter element 630 attaches to filter housing 620 and seals clean and dirty sides of the filter with seal 622. The filter element 630 has a top end-cap 640, bottom end-cap 650, and inner liner 670. Piston 680 with entrapped gas 682 and seal 684 is located below bottom end-cap. A similar piston or pistons can be positioned above the top end-cap.

Figure 8:
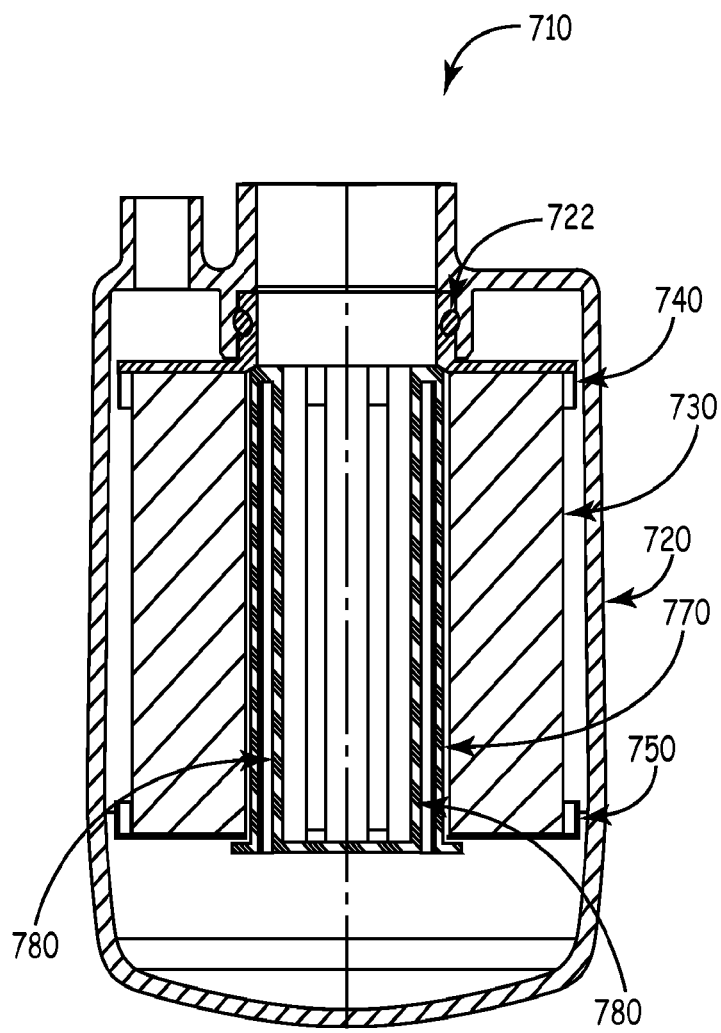
FIG. 8 shows an alternative filter assembly made in accordance with an implementation of the invention.

In an alternative embodiment, volume expansion with entrapped gas in column(s) is used to accommodate expansion of freezing liquids. A column has an opening to allow liquid to enter and expand in volume during freezing. In reference now to FIG. 8, an_alternative filter assembly 710 is made up of a filter housing 720 (shown in basic detail) and filter element 730, inner liner 770, and top end-cap 740 plus bottom end-cap 750. The filter element 730 attaches to filter housing 720 and seals clean and dirty sides of the filter with seals 722. The filter element has a top end-cap 740, bottom end-cap 750, and inner liner 770. Cylinders 780 entrap gas and allow volume expansion when needed. The cylinders 780 are open on the bottom, but allow formation of an air pocket that retains sufficient air to allow a meaningful amount of liquid expansion within the housing to occur without damage to the filter housing or internal components.

Figure 13:
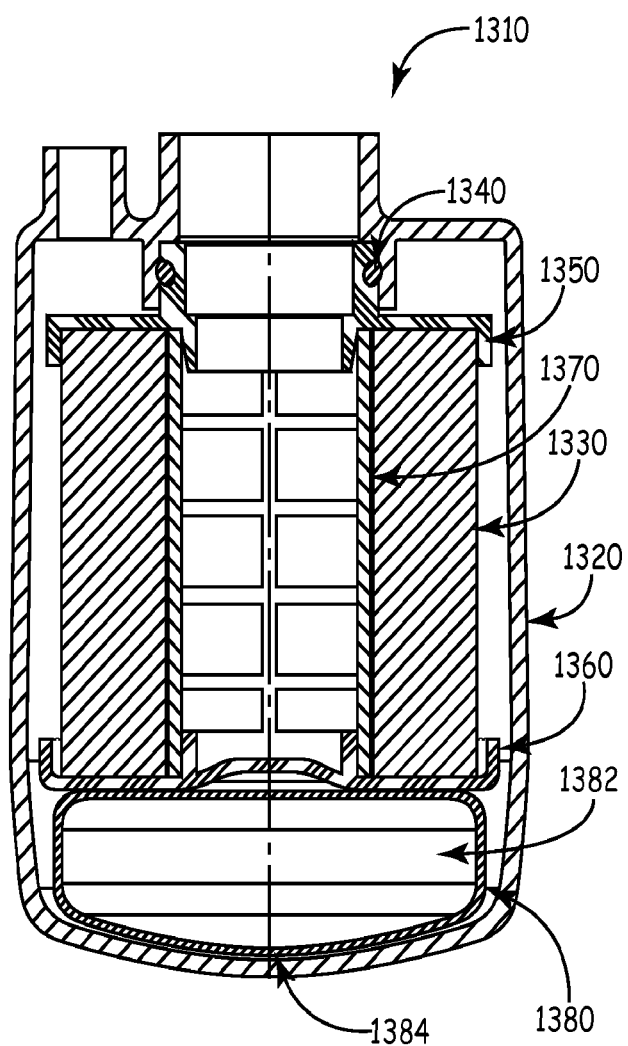
FIG. 13 shows an alternative filter assembly made in accordance with an implementation of the invention.

One embodiment that is depicted in FIG. 13, a_filter assembly 1310 is made up of a filter housing 1320 and filter element 1330, inner liner 1370, and top end-cap 1350 plus bottom end-cap 1360. The filter element 1330 attaches to filter housing 1320 and seals clean and dirty sides of the filter with seals 1340. The filter element 1330 has a top end-cap 1350, bottom end-cap 1360, and inner liner 1370. A compressible element 1380 defining an opening 1384 and a void volume 1382, is disposed within the housing 1320. In this particular embodiment, the compressible element 1380 can have a rigid housing, which will be explained in more detail below. Upon the introduction of pressure within the filter housing, fluid is displaced through the opening 1384 of the compressible element 1380 into the void volume 1382, which compresses air within the void volume 1382. Upon reduction of pressure within the filter housing, fluid is released from the void volume 1382 through the opening 1384 of the compressible element 1380.

As described above, in this particular embodiment, the compressible element 1380 can be made from a variety of substantially rigid materials including various plastics and metals. In one embodiment the rigid element 1380 is constructed of a plastic such as glass-filled nylon. In another embodiment the rigid element is constructed of stainless steel. The walls of the rigid element can have a thickness within the range of 1 mm (0.039 inches) to 3 mm (0.118 inches), although those with skill in the art will appreciate that the wall thickness will vary depending on the requirements of the specific material used. In one embodiment the compressible element 1380 can also be made of a flexible material such as nitrile butyl rubber, although not limited to this example.

Figure 14:
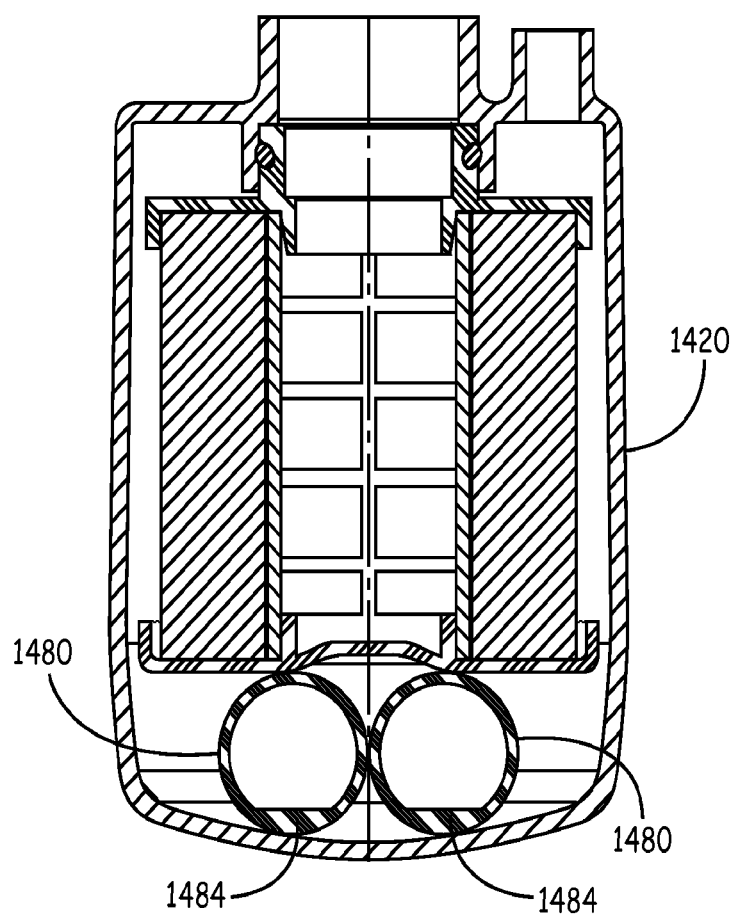
FIG. 14 shows another alternative filter assembly made in accordance with an implementation of the invention.

FIG. 14 depicts an embodiment that can be characterized as a variation of the embodiment depicted in FIG. 13. Two compressible elements 1480 are disposed within the housing 1420, where they each define an opening 1484 and a void volume (not viewable in this figure). In this particular embodiment, the compressible elements 1480 can have a rigid housing similar to the rigid housing described above in the discussion of FIG. 13. Upon the introduction of pressure within the filter housing 1420, fluid is displaced through the opening 1484 of the compressible element 1480 into the void volume, which compresses air within the void volume. Upon reduction of pressure within the filter housing 1420, fluid is released from the void volume through the opening 1484 of the compressible element 1480.

Figure 16:
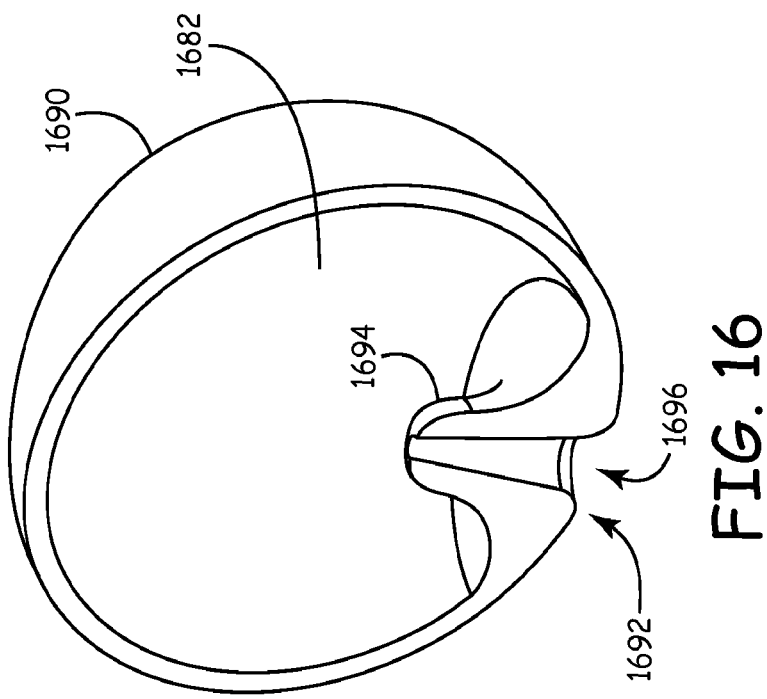
FIG. 16 shows a perspective cross sectional view of another compressible element also consistent with the embodiment depicted in FIG. 14.
Figure 15:
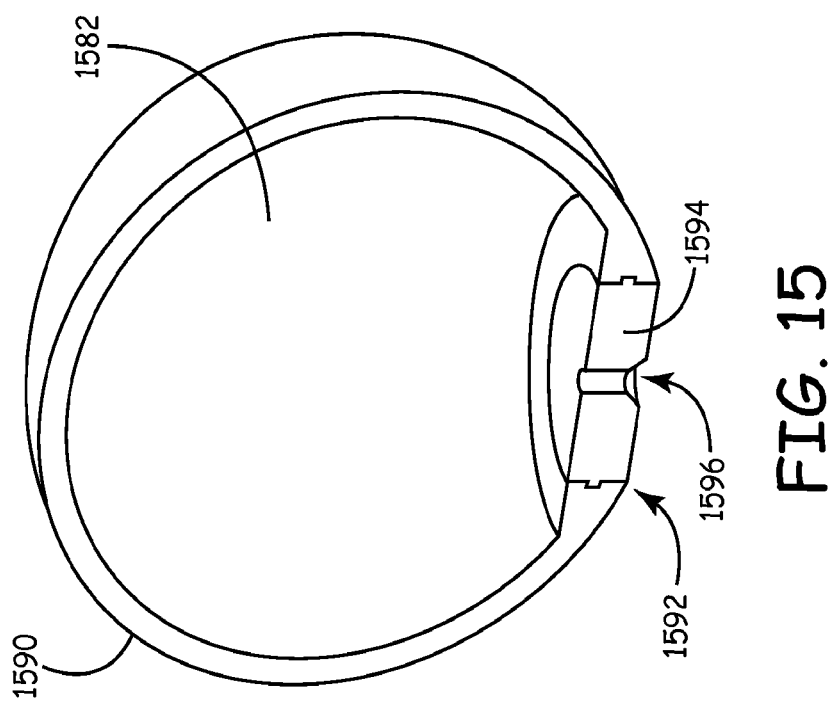
FIG. 15 shows a perspective cross sectional view of a compressible element consistent with the embodiment depicted in FIG. 14.

FIGS. 15 and 16 depict example cross sections of two particular embodiments of the compressible elements depicted in FIG. 14. In FIG. 15 the compressible element 1590 defines an opening 1592 and a void volume 1582. The base 1592 of the compressible element 1590 has a weighted portion 1592 that assists in retaining the opening 1596 of the compressible element 1590 towards the bottom relative to the compressible element 1590. The weighted portion 1592 can have a variety of shapes and implementations, and generally is configured to be more dense than the rest of the compressible element 1590 and adjacent to the opening 1596 such that the default position of the opening 1596 is downward in response to gravity.

Instead of incorporating a weighted portion as in the embodiment of FIG. 15, the embodiment of the compressible element 1690 depicted in FIG. 16 incorporates additional material 1694 extending into the volume 1682 and partially defining the opening 1696 of the compressible element 1690. Similar to the embodiment of FIG. 15, the additional material adjacent to the opening 1696 of the compressible element 1690 assists in retaining the opening 1696 at the bottom relative to the compressible element 1690.

Figure 17:
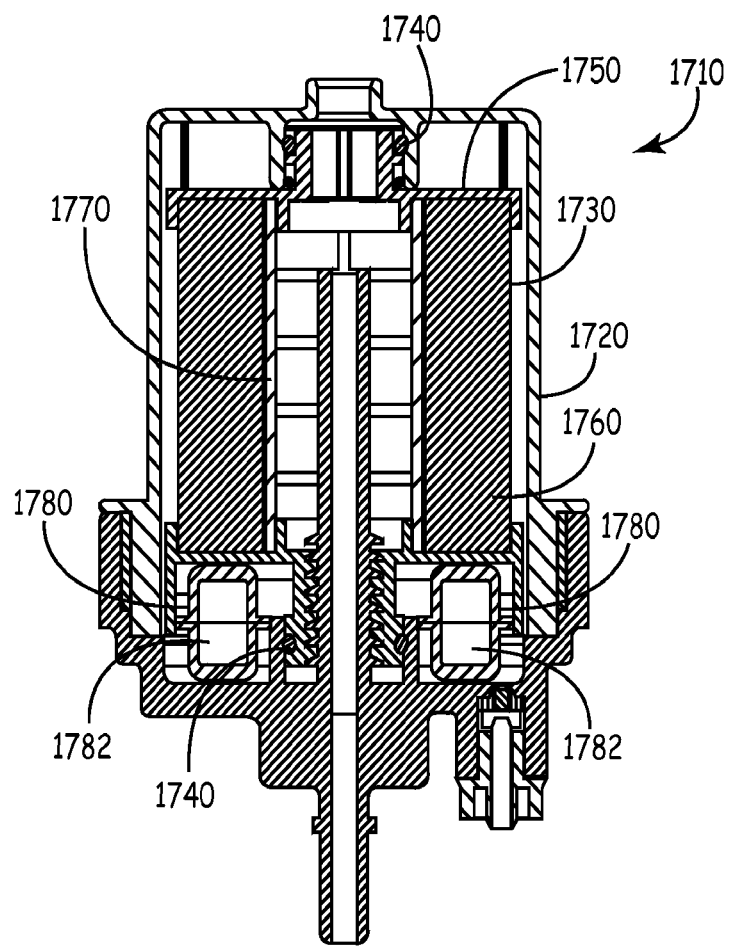
FIG. 17 shows an alternative filter assembly made in accordance with an implementation of the invention.

FIG. 17 depicts in cross section an alternative design in which a compressible element 1780 defines a void volume 1782. The filter assembly 1710 includes a filter housing 1720 (shown in basic detail) and filter element 1730 placed within the housing 1720. The filter element 1730 seals clean and dirty sides of the filter with seals 1740. The filter housing 1720 is generally formed of a material having sufficient rigidity to support the filter element, to allow installation and removal, to withstand impact, and to withstand conditions in cold outside environments, often including use on vehicles. Typically the filter housing is constructed of metal or molded plastic, and is relatively rigid.

In the depicted embodiment of FIG. 17, the filter element 1730 has a top end-cap 1750 and a bottom end-cap 1760. An inner liner 1770 combines with the top end-cap 1750 and bottom end-cap 1760 to provide support for filter element 1730. Thus, filter element 1730 includes filter media that is supported by inner liner 1770, and also generally sealed to top and bottom end caps 1750, 1760.

Freezing of a fluid can start from outside to center of housing, from the center to the outside, from the top to the bottom, from the bottom to the top, or in one of many different orientations. Speed with which freezing occurs depends on thermal patterns and gradients, with lowest temperature spots in the fluid freezing first. When quick freezing occurs, it can easily entrap fluid in a liquid state in portions of the housing. When this occurs, it requires a highly compressible element to absorb volume expansion of most of the fluid. Therefore, in some implementations the filter housing should have one compressible element on each end of the filter element.

In some implementations the compressible elements have edge features that mount to end-caps to position them such that they are completely surrounded by liquid for most effective use of these devices. The same function is also achieved in many ways including, but not limited to, protrusions in the compressible elements.

Compressible elements come in various shapes like, but not limited to, ball, disk, cylinder, tire, or donut. Shape depends in part on physical geometry of adjacent components which in turn vary with each application.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A liquid filter construction comprising:
    a) a filter housing, the filter housing configured to retain a filter element for filtration of a liquid, wherein the liquid is a pressurized aqueous urea solution;
    b) a filter element positioned within the housing;
    c) a compressible element positioned within the filter housing, the compressible element comprising an enclosure wall defining a volume; and
    d) a gas disposed within the volume;
    wherein the compressible element is retained such that it is offset from the filter element and the housing.

2. The liquid filter construction of claim 1, wherein the enclosure wall of the compressible element comprises an elastomeric material.

3. The liquid filter construction of claim 2, wherein the enclosure wall of the compressible element comprises an elastomeric material selected from the group consisting of: nitrile butadiene rubber, butyl, hydrogenated nitrile butadiene rubber, fluoroelastomors, and combinations thereof.

4. The liquid filter construction of claim 1, wherein the gas-filled volume of the compressible element comprises at least 10 percent of the volume of the compressible element.

5. The liquid filter construction of claim 1, wherein the compressible element can be compressed by at least 10 percent when exposed to pressure from a freezing fluid, and then returns to its original volume upon melting of the freezing fluid.

6. The liquid filter construction of claim 1, wherein the compressible element can be compressed by at least 50 percent when exposed to pressure from a freezing fluid, and then returns to its original volume upon melting of the freezing fluid.

7. The liquid filter construction of claim 1, wherein the gas-filled volume of the compressible element comprises at least 90 percent of the volume of the compressible element.

* * * * *